United States Patent
Yim et al.

(10) Patent No.: US 10,203,996 B2
(45) Date of Patent: *Feb. 12, 2019

(54) FILTERING SYSTEM NOISES IN PARALLEL COMPUTER SYSTEM DURING THREAD SYNCHRONIZATION

(71) Applicant: International Business Machines Corporation, Armonk, NY (US)

(72) Inventors: Keun Soo Yim, Sunnyvale, CA (US); Seetharami R. Seelam, Yorktown Heights, NY (US); Liana L. Fong, Irvington, NY (US); Arun Iyengar, Yorktown Heights, NY (US); John Lewars, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/381,208

(22) Filed: Dec. 16, 2016

(65) Prior Publication Data

US 2017/0097856 A1    Apr. 6, 2017

Related U.S. Application Data

(63) Continuation of application No. 15/085,201, filed on Mar. 30, 2016, now Pat. No. 9,558,095, which is a
(Continued)

(51) Int. Cl.
*G06F 9/455*    (2018.01)
*G06F 9/46*    (2006.01)
(Continued)

(52) U.S. Cl.
CPC ............ *G06F 9/522* (2013.01); *G06F 9/4881* (2013.01); *G06F 11/3024* (2013.01);
(Continued)

(58) Field of Classification Search
None
See application file for complete search history.

(56) References Cited

U.S. PATENT DOCUMENTS 6,021,457 A    2/2000    Archer et al.
6,175,914 B1   1/2001    Mann
(Continued)

OTHER PUBLICATIONS

Mohsen, M.S. et al., "A Survey on Performance Tools for OpenMP," World Academy of Science, Engineering and Technology 49 2009.
(Continued)

*Primary Examiner* — Bradley A Teets
(74) *Attorney, Agent, or Firm* — Fleit Gibbons Gutman Bongini Bianco PL; Thomas S. Grzesik

(57) ABSTRACT

Various embodiments monitor system noise in a parallel computing system. In one embodiment, at least one set of system noise data is stored in a shared buffer during a first computation interval. The set of system noise data is detected during the first computation interval and is associated with at least one parallel thread in a plurality of parallel threads. Each thread in the plurality of parallel threads is a thread of a program. The set of system noise data is filtered during a second computation interval based on at least one filtering condition creating a filtered set of system noise data. The filtered set of system noise data is then stored.

17 Claims, 6 Drawing Sheets

Related U.S. Application Data continuation of application No. 13/945,559, filed on Jul. 18, 2013, now Pat. No. 9,361,202.

(51) Int. Cl.
    *G06F 9/52*       (2006.01)
    *G06F 11/34*     (2006.01)
    *G06F 11/30*     (2006.01)
    *G06F 9/48*       (2006.01)

(52) U.S. Cl.
    CPC ...... *G06F 11/3072* (2013.01); *G06F 11/3404* (2013.01); *G06F 11/3409* (2013.01); *G06F 11/3476* (2013.01); *G06F 11/3419* (2013.01); *G06F 2201/815* (2013.01); *G06F 2201/88* (2013.01)

(56) References Cited

U.S. PATENT DOCUMENTS

| | | | |
|---|---|---|---|
| 6,507,805 B1 | 1/2003 | Gordon et al. | |
| 7,548,842 B2 | 6/2009 | Ganesan et al. | |
| 7,797,585 B1 | 9/2010 | Sahin et al. | |
| 9,361,202 B2* | 6/2016 | Yim | G06F 9/522 |
| 9,558,095 B2* | 1/2017 | Yim | G06F 9/522 |
| 2002/0174415 A1* | 11/2002 | Hines | G06F 8/36 717/127 |
| 2008/0244592 A1* | 10/2008 | Uchihira | G06F 9/4881 718/103 |
| 2009/0287907 A1* | 11/2009 | Isherwood | G06F 9/3836 712/205 |
| 2009/0319996 A1* | 12/2009 | Shafi | G06F 8/314 717/125 |
| 2010/0031265 A1* | 2/2010 | Koning | G06F 9/5011 718/104 |
| 2010/0095045 A1* | 4/2010 | Lambeth | G06F 9/45558 711/6 |
| 2011/0077965 A1* | 3/2011 | Nolte | G06Q 10/10 705/3 |
| 2012/0084517 A1* | 4/2012 | Post | G06F 9/45541 711/153 |
| 2012/0159454 A1* | 6/2012 | Barham | G06F 9/45558 717/128 |
| 2014/0173359 A1* | 6/2014 | Basava | G06F 11/3409 714/47.1 |
| 2014/0189104 A1* | 7/2014 | Dalton | H04L 43/0876 709/224 |

OTHER PUBLICATIONS

Rover, D.T., "A Performance Visualization Paradigm for Data Parallel Computing," System Sciences, 1992. Proceedings of the Twenty-Fifth Hawaii International Conference. 0073-1129-1/92 Copyright 1992 IEEE.

Malony, A.D. et al. "Tracing Application Program Execution on the Cray X-MP and Cray 2," The Journal of Supercomputing 5.2, Oct. 1991: 137-162, 2916-5190/0000/0060 Copyright IEEE.

Fineman, C. et al., "Selective Monitoring Using Performance Metric Predicates," Proceedings Scalable High Performance Computing Conference, 1992.

Kohl, J.A. et al., "The PVM 3.4 Tracing Facility and XPVM 1.1," Proceedings of the 29th Annual Hawaii International Conference on System Sciences—Jan. 1996. 1060-32/25/96 Copyright 1996 IEEE.

Wolf et al., "Trace-Based Parallel Performance Overhead Compensation," L.T. Yang et al. (Eds.): HPCC 2005, LNCS 3726, pp. 617-628, 2005, Copyright Sringer-Verlag Berlin Heidelberg 2005.

Eason, G., et al., "On certain integrals of Lipschitz-Hankel type involving products of Bessel functions," Phil. Trans. Roy. Soc. London, vol. A247, Abstract only, Apr. 1955.

Komack, D., et al., "Cell Proliferation without Neurogenesis in Adult Primate Neocortex," Science, vol. 294, Dec. 2001, pp. 2127-2130, doi:10.1126/science.1065467.

\* cited by examiner

FILTERING SYSTEM NOISES IN PARALLEL COMPUTER SYSTEM DURING THREAD SYNCHRONIZATION

STATEMENT REGARDING FEDERALLY SPONSORED RESEARCH OR DEVELOPMENT

This invention was made with Government support under Contract No.: HR0011-07-9-0002 ((DARPA) Defense Advanced Research Projects Agency). The Government has certain rights in this invention.

BACKGROUND

The present invention generally relates to parallel computing systems, and more particularly relates to monitoring system noises in parallel computing systems.

Monitoring system noises and understanding their impact on application performance are critical for the design and operation of parallel computers. The performance imbalance between concurrent threads is an important technical hurdle for improving the parallel scalability of massively parallel systems. In many parallel programs, the executions of all or each group of threads are frequently synchronized (e.g., to send computation results from all threads to all threads). As the numbers of nodes and cores per node grow continuously, a much larger number of threads will be collaborating for the same amount of computation (i.e., strong scaling). Consequently, the computation interval is reduced, which increases the impact of performance imbalance.

BRIEF SUMMARY

In one embodiment, a method for monitoring system noise in a parallel computing system is disclosed. The method comprises storing at least one set of system noise data in a buffer during a first computation interval. The set of system noise data is detected during the first computation interval and is associated with at least one parallel thread in a plurality of parallel threads. Each thread in the plurality of parallel threads is a thread of a program. The set of system noise data is filtered during a second computation interval based on at least one filtering condition creating a filtered set of system noise data. The filtered set of system noise data is then stored.

In another embodiment, an information processing system for monitoring system noise in a parallel computing system is disclosed. The information processing system comprises a memory and a processor that is communicatively coupled to the memory. A system noise monitor is communicatively coupled to the memory and the processor. The system noise monitor is configured to perform a method. The method comprises storing at least one set of system noise data in a buffer during a first computation interval. The set of system noise data is detected during the first computation interval and is associated with at least one parallel thread in a plurality of parallel threads. Each thread in the plurality of parallel threads is a thread of a program. The set of system noise data is filtered during a second computation interval based on at least one filtering condition creating a filtered set of system noise data. The filtered set of system noise data is then stored.

A computer program product comprising a computer readable storage medium containing computer code that, when executed by a computer, implements a method for monitoring system noise data in a parallel computing system. The method comprises storing at least one set of system noise data in a buffer during a first computation interval. The set of system noise data is detected during the first computation interval and is associated with at least one parallel thread in a plurality of parallel threads. Each thread in the plurality of parallel threads is a thread of a program. The set of system noise data is filtered during a second computation interval based on at least one filtering condition creating a filtered set of system noise data. The filtered set of system noise data is then stored.

In a further embodiment, a method for monitoring system noise in a parallel computing system is disclosed. The method comprises storing, during at least computation interval N, at least a first set of system noise data in a buffer. The first set of system noise data is detected during the at least one computation interval and is associated with at least one parallel thread in a plurality of parallel threads. Each thread in the plurality of parallel threads is a thread of a program. At least a second set of system noise data stored in the noise buffer is filtered during computation interval N. The second set of system noise data was stored in the noise buffer during a computation interval N−1. The second set of system noise data is associated with at least one parallel thread in the plurality of parallel threads. At least a third set of system noise data is reported during computation interval N. The third set of system noise data was stored in the noise buffer during a computation interval N−2. The third set of system noise data is associated with at least one parallel thread in the plurality of parallel threads.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
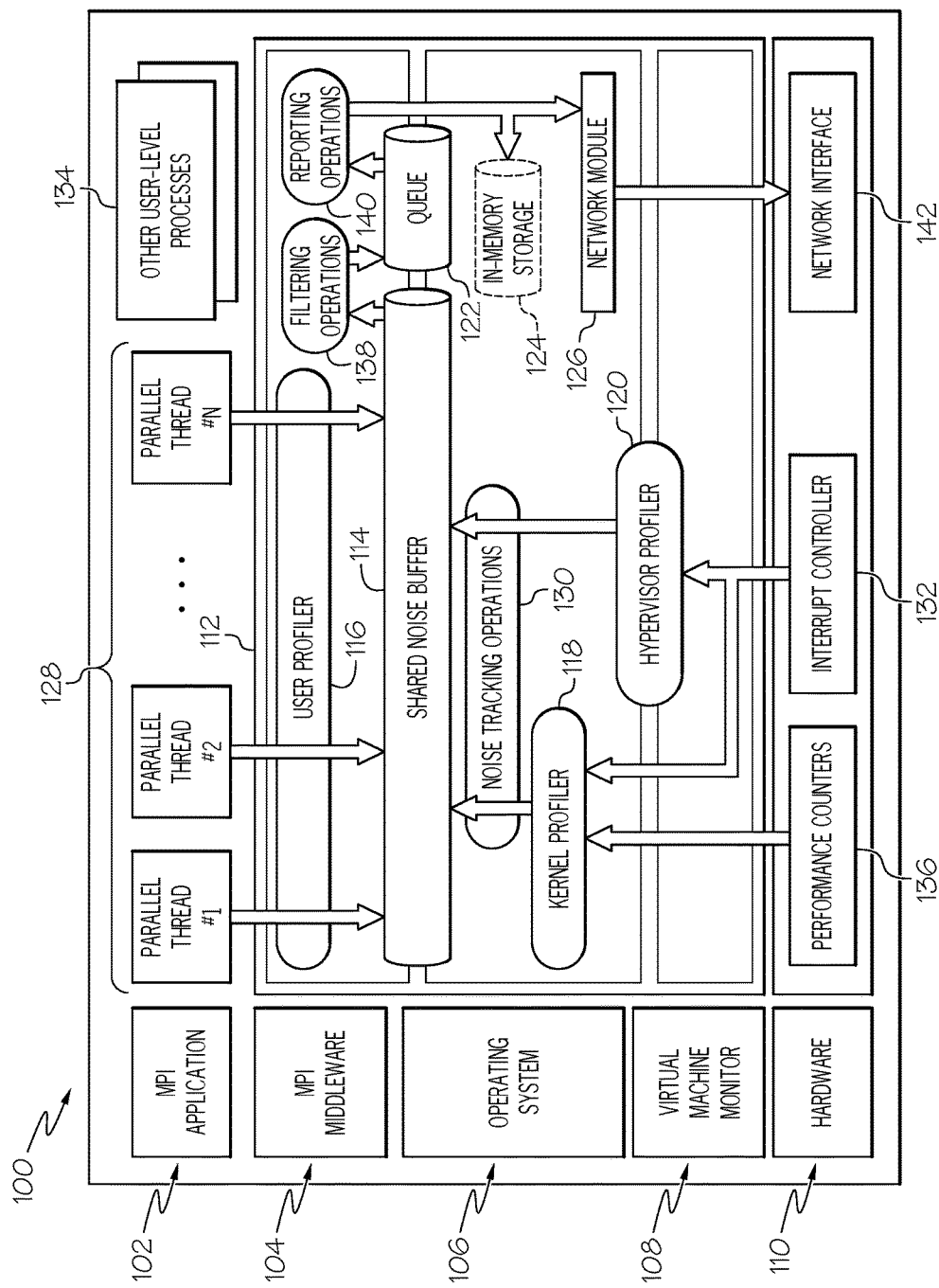
FIG. 1 is a block diagram illustrating one example of an architecture for monitoring system noises in a parallel computing system according to one embodiment of the present invention.

Long-term or continuous monitoring of system noises in parallel computing systems is often necessary and is useful for various purposes. For example, by monitoring system noise for several hours a noise profile can be obtained that is statistically similar to one measurable by monitoring a node for one day. When the monitoring time is several minutes a non-negligible fraction of system noises is missed (e.g., low frequency noises). Thus, long-term monitoring is important for validity of the analysis results. Continuous runtime monitoring allows a user to quickly detect slowdowns due to unexpected sources. For example, application execution can be perturbed by a hardware fault (i.e., relatively frequent in large-scale systems) or a misconfiguration of a network or software. If system performance is monitored in real-time, faults of misconfigurations can corrected by a user in a timely-manner without having to wait until program finishes).

One or more embodiments advantageously provide a framework that continuously monitors system noises. System administrators are notified of the slow threads and the experienced noise sources in real-time. In one embodiment, various types of system events are analyzed and correlated at runtime. In this embodiment, various events are correlated by utilizing a set of noise buffers that is directly mapped into the virtual address spaces of user-level threads of a target program and the operating system (OS) kernel. Events collected in different layers are directly stored in these buffers. In one embodiment, the set of buffers comprises plurality of buffers. In this embodiment, there is a buffer for a current iteration of the target program, a buffer for the last iteration of the target program, and a buffer for the second-to-last iteration of the target program. User-level or kernel level instrumentation routine rotates these buffers as the thread progresses.

In a current iteration, kernel-level routines track system noises in user, kernel, and hypervisor spaces. The noise data tracked for a given computation interval is then filtered in the next computation interval based on user-provided conditions (e.g., slow thread). In the following iteration, the filtered data is either reported to a control server or kept in a compact form, while the rest of data can be discarded or stored. This pipelined tracking of system noises allows for the continuous monitoring of specific types of data by using fixed size of memory buffers.

Various types of system noise sources can be monitored by embodiments of the present invention. One type of system noise source is application workload imbalance. The amount of computation work given to each thread in the same computation interval is typically not fixed in practical parallel programs. For example, sparse matrix multiplication time depends on the value of input matrixes, and algorithms using unbalanced trees or unstructured meshes show irregular performance In SPMD (single program, multiple data) programs, multiple control-flow paths exist where different paths can be taken by different threads (e.g., due to different roles of threads or differences in the shapes or values of the processed data).

Application workload imbalance can be measured by using performance counters in modern processors. For example, counting the number of committed instructions by each user-level thread shows the quantitative difference in the size of computed tasks. It should be noted that finer-grained counting is useful to improve the measurement accuracy. For example, two threads with two different control-flow paths may have similar numbers of committed instructions. In order to distinguish these two threads, specific types of committed instructions (e.g., branches, memory load, or memory store) can be counted. A weighted summation of these counters gives a unified metric.

Another type of system noise source is software interference. Software interference can be classified into four subtypes (e.g., other thread, OS kernel, hardware interrupts, and hypervisor interrupts) depending on the type of entity that delays an application thread. Regarding the other thread subtype, other user-level or OS kernel-level thread can perform preemption. For example, if a higher priority user and kernel thread is ready, this thread preempts a parallel thread in the next scheduling point. Regarding the OS kernel subtype, common OS activities can also preempt a user thread. These activities include interrupt handling and system call operations requested by the target application threads, where hardware interrupts can be requested at any time. The interrupt handler is invoked upon a request by preempting the current thread if the interrupt is not disabled (e.g., critical section of kernel).

Regarding the hypervisor subtype, the hypervisor runs under the operating system (OS) in many large-scale systems for the maintenance of system software/hardware and consolidation. Hypervisor jobs generally have higher priority than user-level processes. These jobs include hypercall (i.e., for para-virtualized hypervisor to reduce the communication overhead between the hypervisor and guest operating systems); interrupt processing time (e.g., if an interrupt is caught and forwarded by the hypervisor to guest OS); virtualization overhead (e.g., virtual world switching or emulating privileged instructions in full virtualization); hypervisor daemons; and other virtual machines in the same node (e.g., hidden partition for hypervisor management).

Delays by this perturbation source type are directly measurable by using a fine-grained hardware timer (e.g., in processor or board). For example, monitoring routines placed at the entry and exit of an event handler (e.g., interrupt handler in OS) can capture this event handler time. In some instances, the measurability of event can depend on the layer in which the monitoring routines are placed. For example, placing monitoring routines inside OS kernel allows various embodiments to capture almost all events in OS kernel, and user-level and kernel-level threads. However, some hypervisor events are may not be directly measurable by OS-level monitoring routines. One example of this type of hypervisor event is an interrupt caught and absorbed by the hypervisor (i.e., not forwarded to an OS kernel). For this type of event, one or more embodiments utilize special-purpose hardware performance counters tracking hypervisor activities.

Another system noise source is software aftereffect. The execution of another thread changes the hardware state (e.g., cache and translation lookaside buffer (TLB)). These changes can consequently slowdown the execution of a preempted thread. For example, executing a kernel thread may break the instruction fetch queue (e.g., in out-of-order processors), flush TLB entries, and evict many cache lines associated with the preempted thread. If these evicted TLB entries and cache lines are accessed when the preempted thread is resumed, the thread performance is decreased. The actual slowdown percentage depends on the memory system organization (e.g., cycles visible to processor when reading lines from lower layer memories) and the size of polluted states. If there is an intervention by other software execution, the slowdown caused when a preempted thread resumes is measurable by the performance metrics (e.g., instruction per cycle) in the execution/computation intervals of the thread. Alternatively, other types of performance counter (e.g., cache miss) can be used.

Hardware interference is yet another type of system noise source. For example, performance slowdown can be also due to the contention on shared hardware resources. Because the hardware devices (e.g., memory and bus) are shared a thread execution can interfere with executions of other threads. This may be more serious in simultaneous multithreading (SMT) processors because the instruction fetch slots and on-chip caches are shared as well. For example, in some processors, four SMT threads share the fetch slots, and only one instruction from these threads is fetched at a time by using their priorities. Performance counters can track information necessary to estimate delays by this source. For example, a processor can identify the number of cycles that are stalled as the instructions from the other competing threads are scheduled.

Another system noise source is configuration error and hardware fault. In a large-scale system, failure of hardware components or nodes is relatively frequent (e.g., several hours). Hardware failure slows down application execution due to the execution of fault tolerance mechanisms (e.g., error correction by ECC (error correction code) and dynamic replacement of a failed component). Similarly, misconfiguration of a network or a node is another non-negligible source. Delays by this type of perturbation source, in one embodiment, can be measured utilizing techniques to measure delays by the other types of sources. For example, if a user-level or kernel-level thread is running to recover the system from a crashed software module or a failed hardware, the execution of this rescue thread is caught by the software interference tracking technique. The number of detected and corrected memory bit errors is caught and saved by the machine checks in processor (e.g., x86). This can be also tracked by techniques for hardware interference.

FIG. 1 shows one example of a system architecture 100 for monitoring system noise according to one or more embodiments. In particular, FIG. 1 shows the various layers of a computing system(s) implementing the architecture 100. For example, FIG. 1 shows a messaging passing interface (MPI) application layer 102, an MPI middleware layer 104, an operating system layer 106, a virtual machine monitor layer 108, and a hardware layer 110. A system noise monitor 112 is situated across one or more of these layers. The system noise monitor 112 comprises a shared noise buffer 114, a user profiler 116, a kernel profiler 118, a hypervisor profiler 120, a set of queues 122, in-memory storage 124, and a network module 126 such as (but not limited to) a User Datagram Protocol (UDP) module. In one embodiment, user-level parallel threads 128 are also part of the system noise monitor 112 as well. The system noise monitor 112 can reside within a single information processing system. However, in other embodiments, the components of the system noise monitor 112 can be distributed across multiple information processing systems as well.

Figure 2:
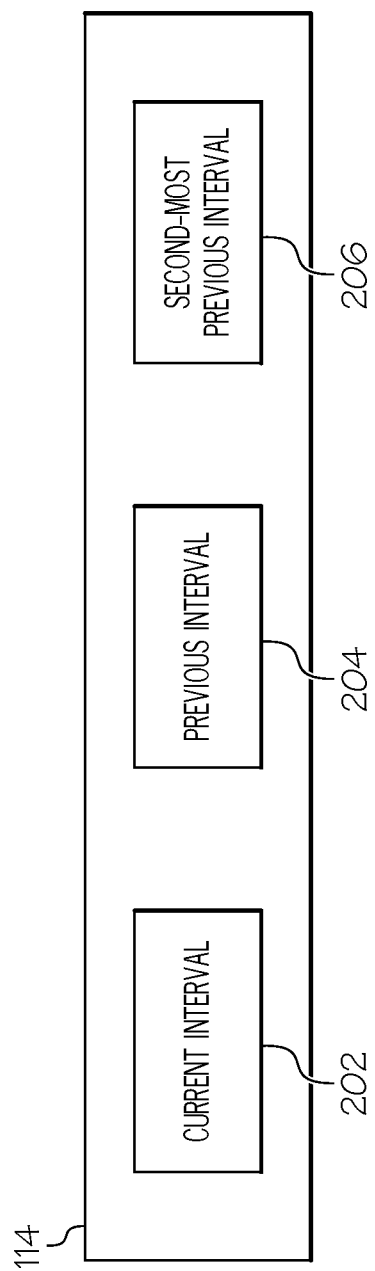
FIG. 2 illustrates one example of a shared system noise buffer according to one embodiment of the present invention.

In one embodiment, the shared noise buffer 114 stores information associated with system noises detected within the system(s) implementing the system noise monitor 112. System noise is any activity that impacts application performance directly (by taking CPU cycles) or indirectly (by causing contention on shared resources). The noise buffer 114 is shared between application parallel threads 128 and the OS kernel 106. A thread, in one embodiment, is an execution path taken by a sequence of instructions. The noise buffer 114 stores the execution phase of each thread 128 and information/data associated with the delays (system noises) introduced while each thread 128 is executing on its specific phase. The noise buffer 114, in one embodiment, is implemented by mapping a set of memory areas to the virtual address spaces of all threads 128 and the OS kernel 106. The buffer 114, in this embodiment, is a circular buffer with at least three buffer entries, as shown in FIG. 2. However, fewer entries or additional entries are also applicable as well. In another embodiment, the noise buffer 114 is a plurality of separate buffers.

The first buffer entry 202 stores noise data for the current iteration (N) of the program. The second buffer entry 204 stores noise data for the previous iteration (N−1) of the program. The third buffer entry 206 stores noise data for the second-most previous iteration (N−2) of the program. As the threads 128 progress pointers for these entries are updated to point to the correct buffer entries.

In one embodiment, system noises are monitored for and detected by the user profiler 116, kernel profiler 118, and/or the hypervisor profiler 120. In this embodiment, one or more of these profilers 116, 118, 120 perform noise-tracking operations 130 for monitoring and recording system noises experienced by one or more of the threads 128. These operations 130 can be performed during every computation interval or every Y computation intervals. The noise-tracking operations 130 performed by at least one of the profilers 116, 118, 120 convert system events (e.g., entry and exit of an interrupt handler) to system noise information/data (delay information/data). For example, the noise-tracking operations 130 convert system-level events into delays, which are the number of cycles the application thread was impacted by system noise, and associate these delays with the execution phase of each application thread. The delays along with information associated therewith are then stored in the buffer entry 202 for the current computation interval.

Figure 3:
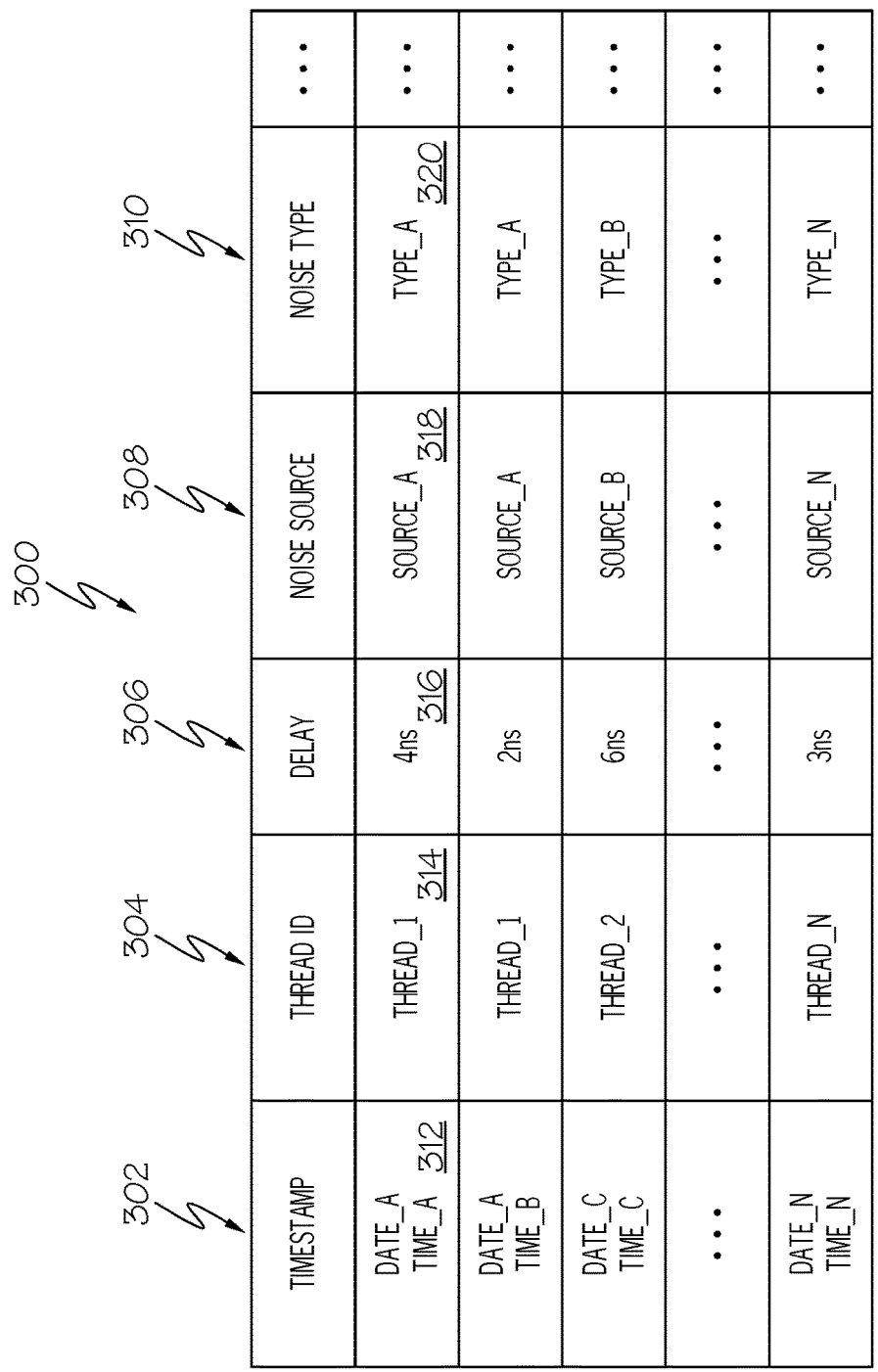
FIG. 3 illustrates one example of system noise data stored within the shared system noise buffer of FIG. 2 according to one embodiment of the present invention.

In one embodiment, the noise (delay) data stored within the noise buffer 114 comprises, for example, one or more timestamps associated with a detected delay; an identifier associated with the thread that experienced the noise; the delay caused by the noise; an identifier associated with noise source; and an identifier associated with the type of noise detected. For example, FIG. 3 shows one example of noise data 300 stored within the noise buffer 114. The noise data 300, in one embodiment, is stored in table form. However, other mechanisms/formats for storing the noise data 300 are applicable as well.

In this example, the noise data 300 comprises a "Timestamp" column 302, a "Thread ID" column 304, a "Delay" column 306, a "Noise Source" column 308, and a "Noise Type" column 310. The "Timestamp" column 302 comprises entries 312 with date and time information identifying when a delay/noise event was detected. This information can also identify when the delay/noise event started and when the delay/noise event ended. The "Thread ID" column 304 comprises entries 314 identifying a thread that experienced the delay/noise event. The "Delay" column 306 comprises entries 316 identifying how long the thread was delayed by the noise event during the interval in which the noise was experienced by the thread. The "Noise Source" column 308 comprises entries 316 identifying the source of the delay/noise event. The "Noise Type" column 310 comprises entries 320 identifying the type of delay/noise event that was experienced by the thread. It should be noted that additional information can also be included (or removed) from the example shown in FIG. 3

The user profiler 116, in one embodiment, is implemented by utilizing the source code of the MPI API (Application Programming Interface) wrappers. Synchronization functions (e.g., MPI_Barrier( ), MPI_Reduce( ), MPI_Alltoall( ), MPI_Allreduce( )) are utilized by the user profiler 116 to store the current timestamp and the type of the current MPI event to the buffer entry 202 in the noise buffer 114 for the current interval. In one embodiment, a hardware timer clock (e.g., timebase register) that is accessible by a register move instruction is also utilized by the user profiler 116. This provides a granularity for the timestamps on at least a nanosecond level (e.g., two nanoseconds). The timestamp read by the user profiler 116 is then saved to the current interval buffer entry 202. Some of the other types of MPI functions (e.g., MPI_Init( ) and MPI_Terminate( )) are also utilized by the user profiler 116 to setup the measurement environments and to clean up the environments.

The kernel profiler 118, in one embodiment, is implemented as a kernel module and a set of kernel patches. The kernel patches introduce the trace points at the entry and exit of handlers of important OS kernel events. Examples of OS kernel events include, but are not limited to, IRQ's, timers, context switch routines, etc. The locations of these trace point hooks include (but are not limited to) the Interrupt Request (IRQ) handlers 132, timer handlers, tracepoints, worklets, and context switch routine. A noise monitoring function is registered to each of these hooks by the kernel module.

When the noise monitoring function is called, interrupt handling time and system call time tracking techniques are used to measure the delays of the noises. Regarding interrupt handling time, delays caused by interrupt handlers/controllers 132 are captured as system noise and stored in the buffer entry 202 for the current interval. The delay is the difference between the timestamps taken at the entry and exit of this type of handler. Because interrupts can be nested, one or more embodiments utilize a variable to track the nesting depth. For example, consider a variable such as Int_Depth. At the start of the first interrupt, Int_Depth is set to 1. If another interrupts occurs while serving this interrupt, Int_Depth is incremented to 2, and the program starts serving the second interrupt. Once the second interrupt finishes, Int_Depth is set to 1. When the first interrupts finishes Int_Depth is set to 0. Various types of interrupt handling time measurement techniques can be utilized to detect interrupt handler noise. Table 1 below shows one example of pseudo-code of an interrupt handling time measurement technique for detecting interrupt handler noise.

TABLE 1

```
EID = Identifier of interrupt event
If inter_entry(EID):
    If Int_Depth == 0:
        Update OS_INT start time
        Int_Depth++;
    Else
        Update OS_INT cumulative time
        Update OS_INT start time
        Int_Depth++;
Else if Inter_exit(EID):
    Update OS_INT cumulative time
    Update OS_INT start time
    Int_Depth--;
```

The method shown in Table 1 above adds the depth (i.e., number of nested interrupts) of a nested interrupt when an interrupt entry event is observed. If the depth is higher than zero, the kernel profiler 118 measures the delay between any two consecutive interrupt entry and exit events. This allows the system noise monitor 112 to accurately track the interrupt handling time spent by each interrupt request. The identified interrupt handling time is then stored in the current interval buffer entry 202 as delay (noise) data.

The hypervisor profiler 120, in one embodiment, resides in the OS kernel and performs one or more noise-tracking operations 130. The hypervisor profiler 120 can perform noise-tracking operations 130 to detect hypervisor calls and other hypervisor activities. In one embodiment, hypercalls are monitored by placing trace points before and after calling a hypercall from the OS kernel. The conversion of these call and return events to delays is performed in a similar way to the interrupt handling time tracking discussed above. However, if the hypervisor call is made while tracking another type of delay (e.g., inside an interrupt handler), the time spent by the hypercall is subtracted from the other tracked delay. The calculated delay is then stored within the current interval buffer entry 202 of the shared buffer 114.

Hypervisor activities are neither visible nor measurable by the OS kernel because the hypervisor abstracts hardware and provides an illusion of it to software. In one embodiment, a performance counter(s) 136 (e.g., Dispatch Trace Log, DTL) is used to capture hypervisor execution time other than the time spent to serve a hypercall. The performance counter 136 keeps dispatch trace logs of virtual processors. For example, when a switch event (swapping physical processors between virtual processors) occurs between virtual processors the hypervisor profiler 120 records the switch event and its associated timing information in a switch event log. The switch event log is then stored within a log buffer kept by the performance counter using a circular queue data structure. In this example, the timing information is the time to preempt the previous virtual processor and the time to dispatch the new virtual processor together with the reasons of this switching.

At each monitoring point, new log data stored in the DTL buffer is checked and processed similar to other types of measured delays. This is possible because the DTL buffer is readable from the guest OS kernel. This hypervisor execution time includes the time spent by the hypervisor code itself and the time spent by other guest virtual machines or hypervisor daemons (e.g., one periodically checking the health of floating-point unit hardware). Table 2 below shows one example of pseudo-code for the hypervisor activity tracking operations discussed above

TABLE 2

```
Time_Hyp = Time spent by hypervisor
Using DTL buffer updated by processor
If Time_Hyp != 0
    Update Hyp_Other cumulative time
    If Int_Depth != 0
        Update OS_Int start time
```

The hardware performance counter(s) 136, in one embodiment, is configured and/or sampled at selected monitoring points. The selected monitoring points, in one embodiment, can be time based (e.g., every few milliseconds) or trigger, where a trigger occurs when a running counter exceeds a certain threshold. The hardware performance counter 136 is used for multiple purposes such as (but not limited to) software characteristic profiling and software performance measurement. Regarding software characteristic profiling, the hardware performance counter 136 is used to characterize the software (e.g., user threads and OS jobs). The measured characteristics include (but are not limited to) how much of an interval of software execution is memory intensive. In one embodiment, memory intensiveness is measured by counting the number of executed memory load and store instructions or cache misses. Applicable processors support separate performance counters for different software execution modes. This allows various embodiments to configure a performance counter(s) 136 only when the application execution context switches if the characteristics of all system software jobs execution within this interval are measured in together.

Regarding software performance measurement, the workload of the parallel threads of a program is generally not identical. This is due to, for example, the use of irregular data structures. This workload imbalance, in one embodiment, is distinguished from delays introduced by system noises. The performance counters 136 (e.g., number of committed instructions), in one embodiment, can be utilized to measure the workload imbalance.

Once system noise data and any corresponding thread data have been stored within the buffer entry 202 for the current computation interval, filtering operations 138 can be performed thereon. In one embodiment, at least one waiting thread 128 is utilized to perform the filtering operations 138 on the noise (delay) data stored within the noise buffer 114. A waiting parallel thread 128 is a thread that has arrived at a synchronization barrier prior to at least one other parallel thread in the same group of parallel threads.

The filtering operations 138 comprise a plurality of sub-operations including silhouette extraction and filtering. Silhouette extraction, in one embodiment, is performed after if each thread 128 calls its MPI synchronization operation. The silhouette extraction operation, for example, can derive the maximum, minimum, and average computation time of all user-level parallel threads 128 in the current computation interval. For example, each of N thread profiles comprises noise data. For each thread, the noise data is accumulated to compute the total noise. Based on this data per thread, Max is the thread with the most noise, Min is the thread with the least noise, and Avg is the total noise among all threads divided by the total number of threads. This allows for the system noise monitor 112 to identify, among other things, the thread with the fastest computation time, the thread with the second fastest computation time, etc. The silhouette extraction operation can be implemented using atomic instructions in the processor. Table 3 below shows one example of identifying/ranking threads based on their computation times.

TABLE 3

| Initialize | Var_Fastest = 1; |
| --- | --- |
| | Var_2ndFastest = 1; |
| Sync operation | MyVal = 0; |
| | ATOMIC_SWAP(Var_Fastest, MyVal); |
| | if(MyVal == 1){ |
| | /* This is the fastest thread */ |
| | else{ |
| | ATOMIC_SWAP(Var_2ndFastest,MyVal); |
| | if(MyVal == 1){ |
| | /* This is the 2nd fastest thread */ |
| | } |
| | } |

One or more of the waiting threads 128 are then selected to perform filtering operations based on the silhouette extraction operation discussed above. In one embodiment, the second fastest thread performs the operations shown in Table 3 and instructs the selected threads to perform the filtering and reporting operations. For example, using the process shown in Table 3 above, the second-fastest thread (e.g., based on computation time for the interval) waiting at the synchronization barrier is identified and then selected to perform the filtering operations 138 on the noise data within the noise buffer 114. However, it should be noted that any of the waiting threads 128 are selectable for performing the filtering operations 138. It should also be noted that an identification/ranking of threads based on computation time is not required.

In one embodiment, the filtering operations performed by a selected thread(s) 128 are user-specified (or pre-programmed). For example, the filtering operation(s) can include searching for threads where the sum of experienced delays is more than X % of the computation time of the fastest thread in the same interval. In one embodiment, the filtering operation time is guaranteed to be shorter than the waiting time of the second fastest thread in at least a majority of intervals. For example, a set of predefined filtering functions are provided where their worst-case execution time is analyzed in advance and is shorter than the common slack time between the second fastest and slowest threads. In one embodiment, the filtered noise data is stored within a buffer entry within the noise buffer 114 and/or in the queue(s).

The filtering operations 138 check both spatial and temporal variations in the execution time of parallel threads 128 in the same node. In one embodiment, the spatial variation is the difference between threads in the same interval, and the temporal variation is the difference between intervals in the same thread. The spatial and temporal variations along with the noise profile data helps users to accurately capture performance variations between threads in the same node and between nodes. The use of the noise profile (system noise data) and temporal variations, thus, removes the need of inter-node communication when detecting inter-node variations In addition to the filtering operations 138 discussed above, at least one additional waiting thread 128 is selected to perform one or more reporting operations 140. For example, using the process shown in Table 4 above, the fastest thread 128 waiting at the synchronization barrier (e.g., based on computation time for the interval) is identified and selected to perform one or more reporting operations 140 on the filtered system noise data. However, it should be noted that any of the waiting threads 128 are selectable to perform the reporting operations 140.

The selected thread 128 reports the filtered noise data over a network to one or more servers and/or stores the filtered data in local memory 124. Regarding network reporting, a network module 126 and network interface 142 are utilized to sent network packets such as (but not limited to) UDP packets for delivering the filtered noise data to one or more control servers. In one embodiment, the frequency of executing the reporting operations 140 and the size of network packets depend on the provided filtering conditions In another embodiment, the reporting operations 140 store the filtered noise data in memory 124. Because only filtered noise data is kept, the same size of in-memory buffer can be used for a longer period of time than with a logging-based technique. The actual improvement in the monitoring time depends on the compaction ratio where the compaction ratio is determined by the filtering conditions.

In one embodiment, the noise-tracking 130, filtering 138, and reporting operations 140 discussed above are processed in a pipelined manner for a given set of system noise data. For example, during a given computation interval, T0, one or more of the profilers 116, 118, 120 store noise data within the current interval buffer entry 202 of the noise buffer 144. In the next interval, T0+1, the current interval buffer entry 202 from the previous interval, T0, is now the previous interval buffer entry 204. In this interval, one or more selected threads 128 perform the filtering operations 138 discussed above on noise data within the previous interval buffer entry 204. Executing the filtering operations in a computation interval that is subsequent to a noise-tracking interval allows the system noise monitor 112 to run this process after collecting the data from all threads (i.e., avoiding data race condition). In a subsequent interval, T0+2, the previous interval buffer entry 204 from interval T0+1 is now the second-most previous interval buffer entry 206. In this interval, one or more selected threads 128 perform reporting operations 140 on filtered data from the second-most previous interval buffer entry 206. Executing the reporting in a computation interval that is subsequent to the filtering interval allows the system noise monitor 112 to run filtering and reporting operations 138, 140 for different sets of noise data in parallel by using different threads.

It should be noted that, in one embodiment, multiple operations are being performed during a given interval. For example, during interval T0+1 there exists at a current interval buffer entry 202 where noise data for this interval is being stored, and a previous interval buffer entry 204 on which filtering operations 138 are being performed. It should also be noted that for every interval T0+N (where N≥2) there exists at a current interval buffer entry 202 (for interval T0+N) where noise data for this interval is being stored; a previous interval buffer entry 204 (for interval T0+N−1) on which filtering operations 138 are being performed; and a second-most previous interval buffer entry 206 (for interval T0+N−2) on which reporting operations 140 are being performed. Therefore, even though the noise-tracking, filtering, and reporting operations for a given set of system noise data are pipelined multiple operations can be performed within the same interval for different sets of noise data.

Figure 4:
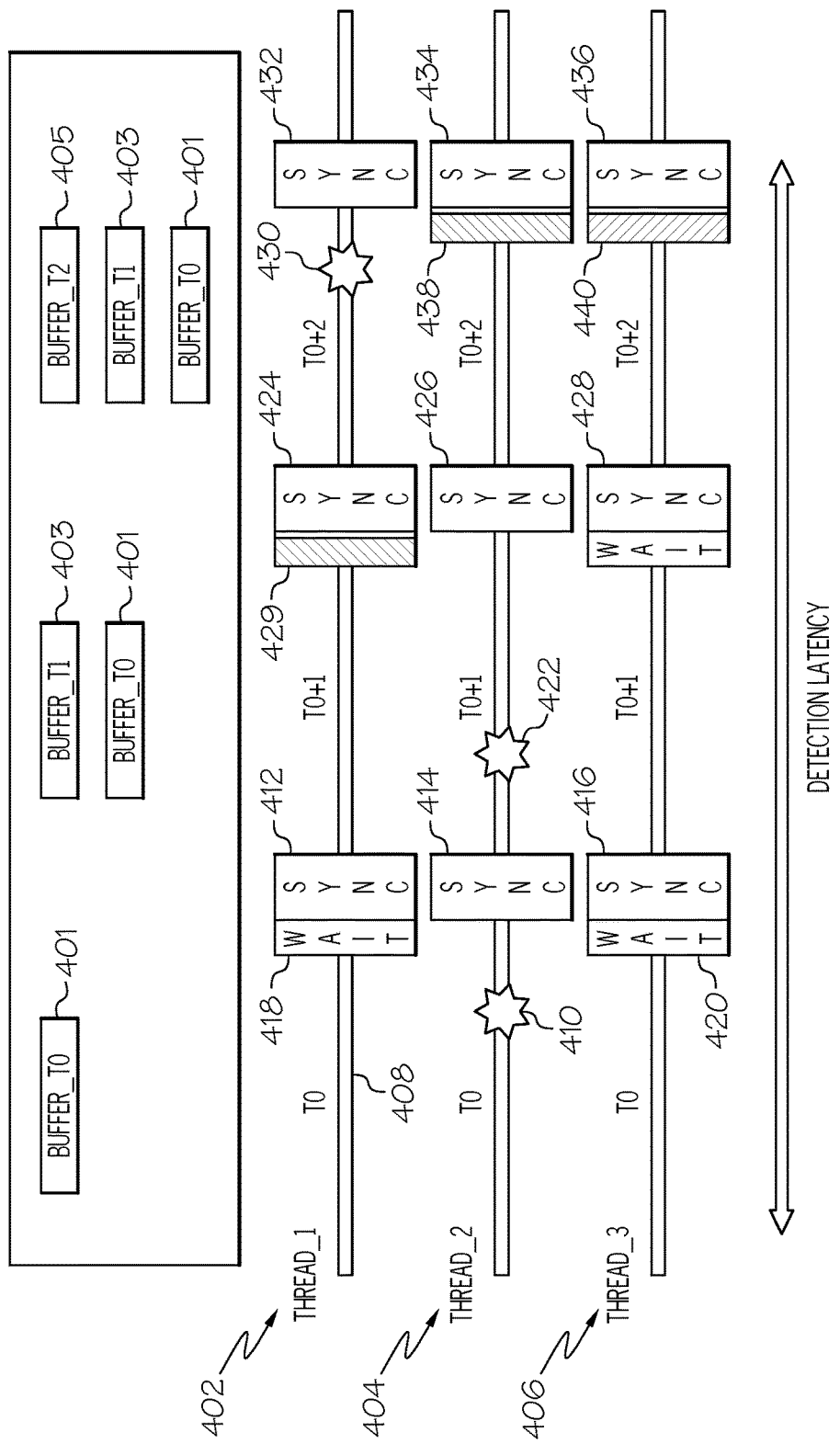
FIG. 4 is a timing diagram illustrating the pipelining of various operations for monitoring system noises in a parallel computing system according to one embodiment of the present invention.

FIG. 4 shows an illustrative example of the pipelined process discussed above. Each row in FIG. 4 corresponds to a parallel thread 402, 404, 406 in a group of related parallel threads. Each "synch" block represents an MPI synchronization operation being performed by the corresponding thread, and each horizontal line 408 represents a computation interval. After an initial synchronization operation each of the threads 402, 404, 406 begins to perform a computation operation and performs noise-tracking operations 130 during interval T0. Each of these threads 402, 404, 406 stores its noise data (if any) within a buffer entry 401, Buffer_T0, for this interval within the noise buffer 114. In this example, the first thread, THREAD_1, and third thread, THREAD_3, have not experienced any system noise, while the second thread, THREAD_2, has been delayed by some system noise 410. Therefore, THREAD_1 and THREAD_3 reach their synchronization barrier 412, 416 prior to THREAD_2, as represented by the waiting blocks 418, 420.

Once all of the threads 402, 404, 406 have reached their synchronization barriers 412, 414, 416, each of the threads 402, 404, 406 begins to perform another computation operation and perform noise-tracking operations 130 during interval T0+1. Each of these threads 402, 404, 406 stores its noise data (if any) within a buffer entry 403, Buffer_T1, for this interval within the noise buffer 114. Similar to interval T0, THREAD_1 and THREAD_3 have not experienced any system noise, while the THREAD_2 has been delayed by some system noise 422. Therefore, THREAD_1 and THREAD_3 reach their synchronization barrier 424, 426, 428 prior to THREAD_2.

In one embodiment, as each thread reaches their synchronization barrier 424, 426, 428 the system noise monitor 112 identifies/ranks the fastest thread, second fastest thread, etc. based on computation time. Based on this ranking, the system noise monitor 112 selects at least one of the waiting threads (e.g., THREAD_1 and THREAD_3) to perform one or more filtering operations 138 on the noise data stored in Buffer_T0 (i.e., the previous interval buffer entry). In one embodiment, the system noise monitor 112 selects the second fastest of THREAD_1 and THREAD_3 to perform the filtering. It should be noted that because the example shown in FIG. 3 starts at an initial interval, T0 (where there is no filtered noise data ready to be reported out) the fastest thread can be selected to perform the filtering as well. It should also be noted that any waiting thread is selectable to perform the filtering operations 130. The selected thread then performs filtering operation operations 138 on the noise data stored in Buffer_T0, as represented by block 429. The filtered noise data is then stored within the queue 122 and/or maintained within Buffer_T0.

Once all of the threads 402, 404, 406 have reach their second synchronization barrier 424, 426, 428, the threads 402, 404, 406 begin to perform another computation operation and monitor for system noise at interval T0+2. Each of these threads 402, 404, 406 stores its system noise data (if any) within a buffer entry 405, Buffer_T2, for this interval within the noise buffer 114. During this interval, THREAD_1 experiences some system noise 430, while THREAD_2 and THREAD_3 do not experience any system noise. Therefore, the THREAD_2 and THREAD_3 reach their synchronization barrier 432, 434, 436 prior to THREAD_1. The system noise monitor 112 selects at least one of the waiting threads (e.g., THREAD_2 and THREAD_3) to perform one or more filtering operations 138 on the noise data for the previous interval buffer, Buffer_T1, and at least one different waiting thread to perform one or more reporting operations 140 on the noise data from the second previous interval buffer, Buffer_T0 filtered in during interval T1. In this example, the system noise monitor 112 selects the fastest thread, THREAD_2, to perform the reporting and the second fastest thread, THREAD_3, to perform the filtering. The selected threads then perform the filtering and reporting operations, as represented by blocks 438, 440, respectively. The above process continues until all computation intervals have completed.

Figure 5:
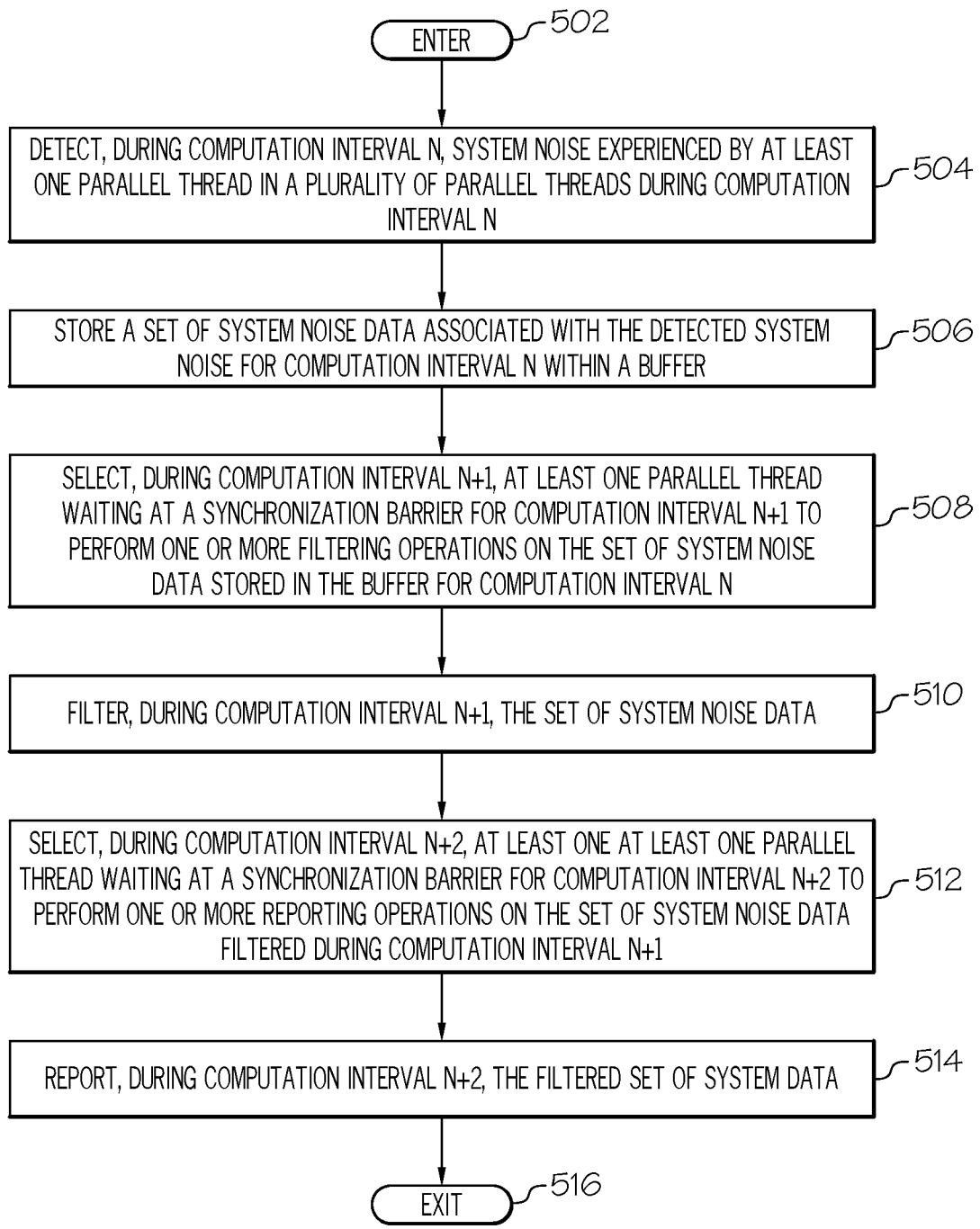
FIG. 5 is an operational flow diagram illustrating one process of monitoring system noises in a parallel computing system according to one embodiment of the present invention.

FIG. 5 is an operational flow diagram illustrating one example of a process for monitoring system noise in a parallel computing system. The operational flow begins at step 502 and flows directly to step 504. The system noise monitor 112, at step 504, detects, during computation interval N, system noise experienced by at least one parallel thread 128 in a plurality of parallel threads during computation interval N. The system noise monitor 112, at step 506, stores a set of system noise data associated with the detected system noise for computation interval N within a noise buffer 114.

The system noise monitor 112, at step 508, selects, during computation interval N+1, at least one parallel thread waiting at a synchronization barrier for computation interval N+1 to perform one or more filtering operations 130 on the set of system noise data stored in the noise buffer 114 for computation interval N. The system monitor 112, at step 510, filters, during computation interval N+1, the set of system noise data. The system noise monitor 112, at step 512, selects, during computation interval N+2, at least one at least one parallel thread waiting at a synchronization barrier for computation interval N+2 to perform one or more reporting operations on the set of system noise data filtered during computation interval N+1. The system noise monitor 112, at step 514, reports, during computation interval N+2, the filtered set of system data. The control flow exits at step 516.

Figure 6:
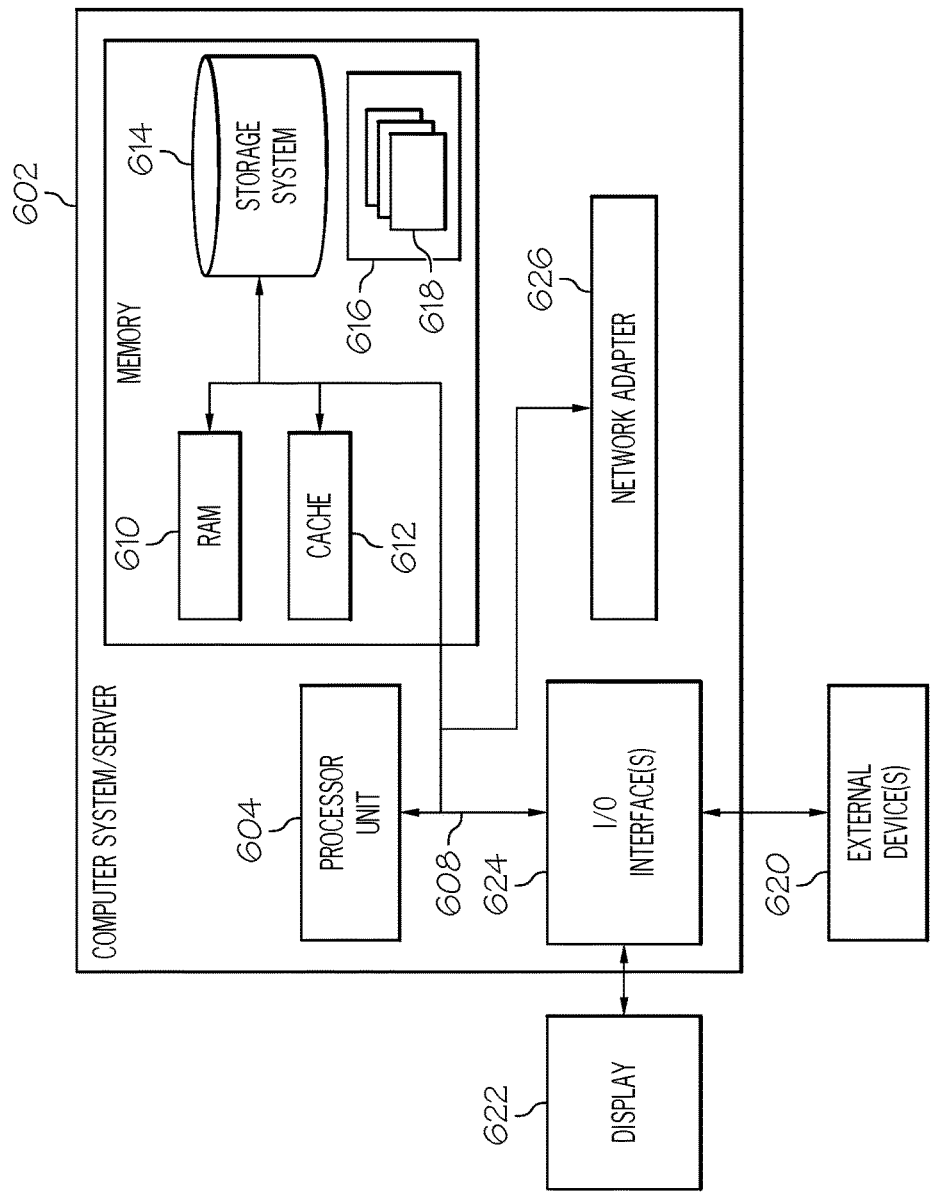
FIG. 6 is a block diagram illustrating a detailed view of an information processing system according to one embodiment of the present invention.

FIG. 6 is a block diagram illustrating a detailed view of an information processing system comprising the system monitor 112 and the architecture 100 shown in FIG. 1 according to one embodiment of the present invention. The information processing system 602 shown in FIG. 6 is only one example of a suitable system and is not intended to limit the scope of use or functionality of embodiments of the present invention described above. The information processing system 602 of FIG. 6 is capable of implementing and/or performing any of the functionality set forth above. Any suitably configured processing system can be used as the information processing system 602 in embodiments of the present invention.

In this embodiment, the information processing system 602 is a parallel processing system that allows parallel applications having several tasks (processes) to execute on the various processors of the information processing system 602. The components of the information processing system 602 can include, but are not limited to, one or more processors or processing units 604, a system memory 606, and a bus 608 that couples various system components including the system memory 606 to the processor 604. In one embodiment, each processing unit 604 can comprise one or more hardware threads (e.g., SMT thread). A hardware thread is a unit of software execution on a multiprocessing computer such as the information processing system 602. A hardware thread is treated as an independent processor by the software executing on the computer 602.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The system memory 606 can include computer system readable media in the form of volatile memory, such as random access memory (RAM) 610 and/or cache memory 612. The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 608 by one or more data media interfaces. The memory 606 can include at least one program product having a set of program modules that are configured to carry out the functions of an embodiment of the present invention.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the present invention.

The information processing system 602 executes software programs such as applications in units of execution called "processes" (i.e., process threads) that include all the processor registers, code segment and offset registers, data segment and offset registers, stack segment and offset registers, flag registers, instruction pointer registers, program counters, and the like that are needed for the execution of software programs. For efficiency, "processes" are often organized further into one or more process threads, where each process thread of a process individually possesses all of the attributes needed for execution, except that a thread shares memory with all of the other threads of the same process to reduce the overhead of operating system switches from process thread to process thread ("context switches").

The information processing system 1402, in one embodiment, communicates with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 1402 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 602. Examples include, but are not limited to: microcode, device drivers, redundant processing units, external disk drive arrays, RAID systems, tape drives, and data archival storage systems.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been discussed above with reference to flowchart illustrations and/or block diagrams of methods, apparatus (systems), and computer program products according to various embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, by a parallel computing system, for monitoring system noise in the parallel computing system, the method comprising:

collecting a set of system noise data during a first computation interval;

determining that a first set of parallel threads in a plurality of parallel threads has reached a synchronization barrier during a second computation interval prior to at least a second set of threads in the plurality of parallel threads;

selecting, based on the determining, at least one parallel thread in the first set of parallel threads to perform filtering of a set of system noise data while the at least one parallel thread waits for one or more remaining threads to reach the synchronization barrier, wherein the at least one parallel thread is selected based on a computation time for the second computation interval associated with each parallel thread of the first set of parallel threads;

performing, by the selected at least one parallel thread in the first set of parallel threads, the filtering of the set of system noise data, wherein the filtering creates a set of filtered system noise data; and selecting, at least one additional parallel thread in the first set of parallel threads to perform a reporting operation while the at least one additional parallel thread waits for the one or more remaining threads to reach the synchronization barrier, wherein the reporting operation reports a set of filtered system noise data for system noise data generated in a computation interval prior to the first computation interval.

2. The method of claim 1, wherein selecting the at least one parallel thread is based on determining the at least one parallel thread has a computation time for the second computation interval that is faster than at least one other parallel thread in the first set of parallel threads.

3. The method of claim 1, further comprising:

reporting, during a third computation interval, the set of filtered system noise data.

4. The method of claim 3, wherein the reporting comprises:

determining that a third set of parallel threads in a plurality of parallel threads has reached a synchronization barrier during the third computation interval prior to at least a fourth set of threads in the plurality of parallel threads; and selecting, at least one parallel thread in the third set of parallel threads to perform the reporting while the at least one parallel thread waits for one or more remaining threads to reach the synchronization barrier.

5. The method of claim 1, wherein the filtered set of system noise data at least identifies a delay experienced by at least one parallel thread in the plurality of threads corresponding to system noise during the first computation interval.

6. The method of claim 1, wherein the at least one parallel thread has a second fastest computation time among the first plurality of parallel threads, and the at least one additional parallel thread has a fastest computation time among the first plurality of parallel threads.

7. An information processing system for monitoring system noise in a parallel computing system comprising the information processing system, the information system comprising:
a memory;
a processor communicatively coupled to the memory; and
a system noise monitor communicatively coupled to the memory and the processor, wherein the system noise monitor is configured to perform a method comprising:
collecting a set of system noise data during a first computation interval;
determining that a first set of parallel threads in a plurality of parallel threads has reached a synchronization barrier during a second computation interval prior to at least a second set of threads in the plurality of parallel threads;
selecting, based on the determining, at least one parallel thread in the first set of parallel threads to perform filtering of a set of system noise data while the at least one parallel thread waits for one or more remaining threads to reach the synchronization barrier, wherein the at least one parallel thread is selected based on a computation time for the second computation interval associated with each parallel thread of the first set of parallel threads;
performing, by the selected at least one parallel thread in the first set of parallel threads, the filtering of the set of system noise data, wherein the filtering creates a set of filtered system noise data; and
selecting, at least one additional parallel thread in the first set of parallel threads to perform a reporting operation while the at least one additional parallel thread waits for the one or more remaining threads to reach the synchronization barrier, wherein the reporting operation reports a set of filtered system noise data for system noise data generated in a computation interval prior to the first computation interval.

8. The information processing system of claim 7, wherein selecting the at least one parallel thread is based on determining the at least one parallel thread has a computation time for the second computation interval that is faster than at least one other parallel thread in the first set of parallel threads.

9. The information processing system of claim 7, wherein the method further comprises:
reporting, during a third computation interval, the set of filtered system noise data.

10. The information processing system of claim 9, wherein the reporting comprises:
determining that a third set of parallel threads in a plurality of parallel threads has reached a synchronization barrier during the third computation interval prior to at least a fourth set of threads in the plurality of parallel threads; and
selecting, at least one parallel thread in the third set of parallel threads to perform the reporting while the at least one parallel thread waits for one or more remaining threads to reach the synchronization barrier.

11. The information processing system of claim 7, wherein the filtered set of system noise data at least identifies a delay experienced by at least one parallel thread in the plurality of threads corresponding to system noise during the first computation interval.

12. A computer program product comprising a non-transitory computer readable storage medium containing computer code that, when executed by a computer, implements a method for monitoring system noise in a parallel computing system, the method comprising:
collecting a set of system noise data during a first computation interval;
determining that a first set of parallel threads in a plurality of parallel threads has reached a synchronization barrier during a second computation interval prior to at least a second set of threads in the plurality of parallel threads;
selecting, based on the determining, at least one parallel thread in the first set of parallel threads to perform filtering of a set of system noise data while the at least one parallel thread waits for one or more remaining threads to reach the synchronization barrier, wherein the at least one parallel thread is selected based on a computation time for the second computation interval associated with each parallel thread of the first set of parallel threads;
performing, by the selected at least one parallel thread in the first set of parallel threads, the filtering of the set of system noise data, wherein the filtering creates a set of filtered system noise data; and
selecting, at least one additional parallel thread in the first set of parallel threads to perform a reporting operation while the at least one additional parallel thread waits for the one or more remaining threads to reach the synchronization barrier, wherein the reporting operation reports a set of filtered system noise data for system noise data generated in a computation interval prior to the first computation interval.

13. The computer program product of claim 12, wherein selecting the at least one parallel thread is based on determining the at least one parallel thread has a computation time for the second computation interval that is faster than at least one other parallel thread in the first set of parallel threads.

14. The computer program product of claim 12, wherein the method further comprises:
reporting, during a third computation interval, the set of filtered system noise data.

15. The computer program product of claim 14, wherein the reporting comprises:
determining that a third set of parallel threads in a plurality of parallel threads has reached a synchronization barrier during the third computation interval prior to at least a fourth set of threads in the plurality of parallel threads; and selecting, at least one parallel thread in the third set of parallel threads to perform the reporting while the at least one parallel thread waits for one or more remaining threads to reach the synchronization barrier.

16. The computer program product of claim 12, wherein the filtered set of system noise data at least identifies a delay experienced by at least one parallel thread in the plurality of threads corresponding to system noise during the first computation interval.

17. The computer program product of claim 12, wherein the at least one parallel thread has a second fastest computation time among the first plurality of parallel threads, and the at least one additional parallel thread has a fastest computation time among the first plurality of parallel threads.

* * * * *